(12) United States Patent
Iversen

(10) Patent No.: US 6,383,562 B1
(45) Date of Patent: May 7, 2002

(54) METHOD AND PLANT FOR THE PREPARATION OF GRANULATED MATERIALS SUCH AS FEEDSTUFF PELLETS SPRAYED WITH ADDITIVES

(75) Inventor: Jan Meincke Iversen, Odense (DK)

(73) Assignee: Sprout-Matador A/S, Vejle (DK)

( * ) Notice: Subject to any disclaimer, the term of this patent is extended or adjusted under 35 U.S.C. 154(b) by 0 days.

(21) Appl. No.: 09/341,677
(22) PCT Filed: Jan. 19, 1998
(86) PCT No.: PCT/DK98/00024
  § 371 Date: Aug. 18, 1999
  § 102(e) Date: Aug. 18, 1999
(87) PCT Pub. No.: WO98/31455
  PCT Pub. Date: Jul. 23, 1998

(30) Foreign Application Priority Data

Jan. 20, 1997 (DK) ............................................. 0073/97

(51) Int. Cl.⁷ ................................................. B05D 7/00
(52) U.S. Cl. .................... 427/212; 427/424; 118/303; 118/668; 222/57
(58) Field of Search ........................... 118/303, 24, 668; 427/212, 2.18, 2.14, 424; 193/10; 99/323, 516; 222/57, 410; 198/450

(56) References Cited

U.S. PATENT DOCUMENTS

| | | | | |
|---|---|---|---|---|
| 1,140,509 A | * | 5/1915 | French | |
| 4,133,290 A | * | 1/1979 | Mellinger | ...................... 118/7 |
| 4,323,314 A | | 4/1982 | Kaiser-Wirz | |

* cited by examiner

*Primary Examiner*—Shrive P. Beck
*Assistant Examiner*—Jennifer A. Calcagni
(74) *Attorney, Agent, or Firm*—Nixon Peabody LLP; David S. Safran

(57) ABSTRACT

In practice it is desirable to enrich feedstuff pellets with various additives in quite small amounts, e.g. only 100 g per ton, preferably that they are sprayed in a dissolved or suspended state on a flat stream of the pellets in cold condition. It is known to arrange this by using a falling stream of the pellets along an inclined chute. However, it is difficult hereby to achieve any particularly good dosing precision of the sprayed materials, some of which can be quite expensive. Moreover, the associated plants are difficult to install in normal premises. With the invention, a flat stream is produced by using an ejector wheel, whereby the chute can be quite short for reducing the construction height and, at the same time that this in itself improves the dosing accuracy, use is made of a continuous mass flow measurement which is used for the regulation of the dosing or the ejector capacity in achieving extra good liquid-dosing precision.

10 Claims, 1 Drawing Sheet

METHOD AND PLANT FOR THE PREPARATION OF GRANULATED MATERIALS SUCH AS FEEDSTUFF PELLETS SPRAYED WITH ADDITIVES

BACKGROUND OF THE INVENTION

The present invention concerns a method and a plant for the preparation of feedstuff pellets by spraying relevant additives in liquid form on a continuous thin layer of the feedstuff pellets. It is generally desirable that in feedstuff pellets there should exist a certain addition of qualified materials such as enzymes, flavouring and vitamins, and it has previously been known to add such materials in solid particle form to the basic material, which is prepared for feeding purposes by pellet pressing. Various recipes can be used, all depending on how the pellets are to be used, and by such mixing in the basic material a precise dosing can be achieved, e.g. based on weighing.

However, most of the relevant additives have proved to be vulnerable to the actual pellet formation process, in that considerable heat is developed when these are pressed, whereby the materials are rendered more or less ineffective or, where some are concerned, are completely ruined. Because of this, an alternative principle of dosing has been employed, i.e. treating the finished and thereafter cooled pellets with the relevant materials in a dissolved or suspended liquid form. Various techniques have been put forward for this purpose, though with inherent disadvantages with regard to capacity, uniformity or dosing precision, and also an undesired crumbling and formation of dust.

It is sufficient here to mention just one of the suggested principles, i.e. the providing of a cascade of the pellet material distributed in a thin layer out over an inclined chute, whereby the quickly down-sliding layer can pass a spraying station from which the layer of pellets can be dosed with the additives through a suitable nozzle arrangement. It is precisiely when this layer is thin and when it is subsequently conveyed for collection, e.g. on a conveyor leading sideways away from the chute, that a certain mixing of the material will occur, whereby it is possible for the product sprayed on the thin layer to spread in a predominantly even manner in the finally collected pellet mass.

There are, however, certain distinct problems connected with this known technique, i.e. partly with regard to the dosing precision of the sprayed-on additives, in that this dosing should, of course, be carefully adapted to suit the current amount of material, i.e. layer thickness and flow-rate of the thin layer of pellets, and partly—of a more practical nature—with regard to the construction height of the plant necessary for establishing a cascade of the thin layer with such a high speed that it is at all possible to operate with a capacity which is of interest in commercial practice.

Both of these problems are quite significant in practice. Consequently, it can clearly be ascertained that the construction height necessary for producing a flow-rate of usable degree will exceed a normal storey height, i.e. the installation of the plant will demand special site conditions. The creation of the thin-layer formation of the pellets could be effected with lower height requirements by feeding the material to a quickly-moving, horizontal conveyor, but for various reasons this solution is not attractive.

Also the second of the above-mentioned problems, i.e. the dosing precision of the additives, is of decisive significance. A plant which should be able to operate with pellet materials of several different kinds will not necessarily deliver these materials in a completely even cascade at uniform speeds and layer thicknesses. Therefore, it can be extremely difficult to determine a correct dosing for the spraying of the pellets. It should be borne in mind that in practice it is current to operate with quite a high capacity, typically 10–100 tons per hour, and with a relatively small addition of liquid, e.g. merely 50 ml-10 litres per ton of material. It is not desirable to operate with additives in specially thin solutions, since the pellets should not be moistened more than is strictly necessary, and for precisely this reason the additives must be held at a minimum, also because in some cases the additives are extremely expensive.

To this can be added that quite strict demands are made on the uniformity of the application both in general and to a particular degree in connection with feedstuff mixtures intended for smaller creatures such as poultry. No useful purpose is served in effecting a dosing of, for example, 200 ml per ton, if the distribution is not good enough to ensure that, at each feeding with a relatively modest amount of feedstuff, the animals will at least receive a more or less representative part of the additives.

It is for this reason so important out of regard for capacity that the dosing of the additives is effected on a quickly-transported flat flow of the material, so that the sparsely dosed additives can be applied to as many of the material particles as at all possible.

It is easy to prescribe that a relevant dosing will be, e.g. 400 ml per ton, but in practice great difficulties have arisen in controlling the current dosing in order to achieve such a desired result while at the same time achieving uniform distribution, and from both the consumer and the producersr's side it has been accepted that appreciable variations can arise with regard to both under- and overdosing to the detriment of the one and the other party respectively, and without any ideal consequences for the animals to be fed.

SUMMARY OF THE INVENTION

With the present invention, the primary intention is to improve the dosing precision of the sprayed-on additives, and in such a way that a distribution of "the dosing per ton" can be effected with appreciably increased precision and good distribution to the advantage of both consumer and manufacturer. While deviations of 10–20% have traditionally had to be accepted, with the invention it will be possible to operate with deviations of only approx. 2%.

One of the uncertainties involved in the use of the down-flow of a thin layer of material on a chute will be that, due to the frictional influences which occur, the different kinds of materials can develop different speeds in their passage through the spraying station, which also applies for one and the same material type, depending on its specific gravity and degree of comminution. Even though these differences in speed are not overwhelmingly great, they can still give rise to appreciable inaccuracies in the effective liquid dosing. A controlled graduation of the spraying capacity could be arranged depending on a measurement of the down-flow speed in or close to the spraying station, but for various reasons this is difficult to realize in practice.

With the present invention it has been found desirable to retain the principle concerning the spraying of a quickly-moving thin layer of material, the reason being that this provides the possibility of good distribution of the expensive elements in the material, but it has also been found desirable to depart from the establishing of a conventional down-flow of the material, in that use is made instead of an ejection arrangement such as a bucket wheel which can eject the flat flow at a controlled desirable speed, so that the flow of material can be fed to the spraying station without having to pass along any longer, friction-generating acceleration section.

There are hereby achieved two substantial advantages, i.e. partly that the speed of the material in the spraying station will be well-controlled regardless of the kind and nature of the material, and partly—purely practical—that the relevant plant can be built with a substantially reduced construction height conventional plants based on gravitational acceleration of the material must necessarily be of a construction height which exceeds normal storey height, otherwise the fall-speed generated will be too low, and for the practical application of the invention it is extremely advantageous that a plant according to the invention can be dimensioned in such a manner that even with the quite great capacity it can still be installed in premises with normal headroom.

With the invention, there is thus provided an immediate solution to the first-mentioned problem regarding the flow-speed of the material in or through the spraying station, but the invention goes further than this, i.e. in recognizing that the desired high degree of dosing accuracy will not be achieved merely by this arrangement. As discussed, there can, for example, arise variations in the specific gravity of the material, which will be without influence on the ejection velocity or layer thickness of the material flow, but which, however, must be taken into account in achieving an accurate "dozing per ton". It will naturally be a possibility to carry out a continuous determination of the specific gravity of samples of the handled material, and an adustment of the spraying equipment depending on the sampling results. However, this must be seen to be a purely theoretical measure due to the associated costs.

However, with the invention it has been found possible to take the weight factor into consideration, and even in two quite different ways:

1 Continous flow weighing

By using a short, inclined chute between the ejection arrangement and the spraying station, it is possible to introduce a path-section at which a continuous determination of the weight of the flat flow of passing material can be carried out. When this determination is compared in a computer unit with information concerning the desired liquid dosing for the relevant material, it will be possible on this basis to effect a control which results in the liquid dosing per unit of weight of the material being regulated to the correct amount. This can be done in two ways, i.e. either by a regulation of the spraying capacity or a regulation of the ejection speed of the material flow, in that here the possibility of regulating the thickness of the material is not considered because it is not desirable to enter into any compromise with regard to the uniform distribution of the additives.

In this connection it is important that the ejection arrangement is configured as a volume-dosing unit, so that purely from the control point of view it is known what amount of material is currently separated in a thin-layer flow, since the speed of this is not, after all, the only decisive factor. If the weighing arrangement registers an increased unit weight of the material flow, this will thus be an indication of a change in the specific gravity and not in the speed, whereby it is possible to generate a control signal which in an unambiguous manner can bring about either a required up-regulation of the liquid dosing or a required down-regulation of the material flow, with associated slight reduction in the speed thereof.

2. Differential weighing-of the material supply:

By a continuous weighing of the amount of material which is at disposal of the ejection arrangement, the speed with which the material is dispensed from the supply can be ascertained, e.g. the supply held in a funnel-shaped container above the ejection arrangement. The mass flow will be given as the weight difference as a function of time. Strictly speaking, it is hereby of no consequence whether the dispensation of the material takes place in a volume-dosed manner, merely providing that the delivery takes place with good uniformity and at the known speed. Moreover, a flow-weighing will not be necessary. When a change occurs in the specific gravity of the material, this will hereby automatically be taken into consideration, in that by the volumetric even dispensation there will be released a correspondingly-changed weight amount per unit of time, which can then be signalled to the regulation unit either for the spraying station or the ejection arrangement.

With continuous operation, this weight-determined control must be suspended during periods in which the container is refilled, but this can take place with such great capacity that such periods will be quite brief. After the refilling, the increased height of the material in the container can serve in such a way that the ejection arrangement will operate with a greater degree of filling, i.e. it will eject an increased flow, but this will be registered already at the first operative differential measurement of the container weight. Moreover, the control unit can be programmed, on the basis of empirical data, to exercise an approximately correct control in the meantime. It will be a further possibility to arrange a more even delivery of the material via a belt weigher, but this gives immediate rise to the problem that there is hereby a distinct risk of a reduction in the high accuracy desired for the effective liquid dosing.

As mentioned, a regulation of the spraying can be effected on the basis of the weighing signals. This is possible within quite a wide area of regulation but, with relatively low liquid dosages, the use of normal spraying nozzles can give rise to problems regarding full coverage of the breadth of the thin layer of material. If it is desired with one and the same plant with more or less high maximum capacity for coarse feedstuffs, e.g. 50 tons per hour, also to be able to a handle fine feedstuffs, e.g. for fish, where an extremely good distribution of the liquid is demanded, it is relevant to ensure that the liquid dosing is not down-regulated so much that the above-mentioned full coverage disappears. A is choice can thus be made to operate constantly with the least possible effective dosing, but on the other hand to carry out the whole regulation on the capacity of the ejection arrangement.

When using a simple ejection arrangement such as a bucket wheel, a regulation of the mass flow will to a wide extent be related with a change in the ejection speed. Conventional fall-flow plants operate with a relatively narrow range of speed, whereby the proportionality is approximated between, e.g,. a flow increase and an increase in the liquid dosing. with the invention, operations can well be effected with a large area of variation for both the mass flow and the speed, e.g. corresponding to 25–100% of the capacity of the ejection unit, but with a change in the flow regard must be paid to the fact that when controlling the liquid dosing, the speed can also be changed to a noticeable degree, generally for damping of the regulation requirement for the liquid dosing.

It must be mentioned that the flow-weight determination as an alternative to the two aforementioned methods can also be effected by continuous weighing of the ejection wheel itself, even though this would immediately appear to be an unrealistic possibility.

It must also be mentioned as an advantage of the invention that the material is handled in such a manner that dust formation is avoided to the widest possible extent, e.g. in that changes in the mass flow are accepted without the use of mechanical throttling of the flow, and moreover by an extremely careful feeding of the material. Feedstuff pellets are potentially dust-forming, and it is characteristic for the dust that it not only absorbs liquid better than the pellets themselves, but is also rejected by the animals as feedstuff. Moreover, it can actually be currect practice to sift out the dust before the pellet material is delivered, and that part of the dosed liquid which has been absorbed by the dust can thus be totally useless.

A plant according to the invention can be configured in a totally enclosed manner to exclude any risk of the material being contaminated.

BRIEF DESCRIPTION OF THE DRAWINGS

The invention will now be described in more detail with reference to the drawing, in which.

DESCRIPTION OF THE PREFERED EMBODIMENTS

Figure 1:
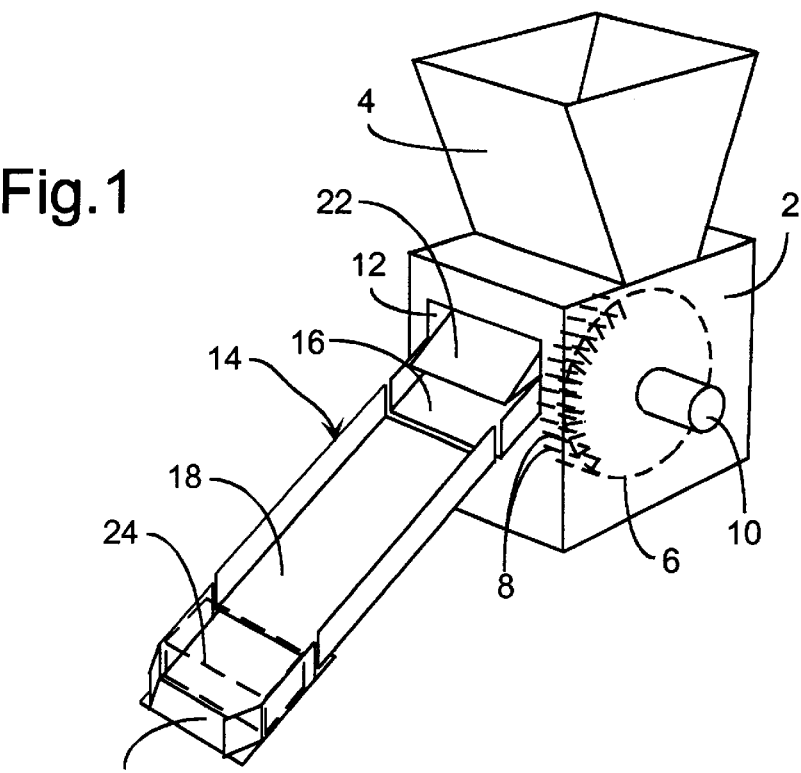
FIG. 1 is a perspective view of a plant according to the invention.

In FIG. 1 is shown an apparatus housing 2, at the top of which feedstuff pellet material is fed through a tube or a funnel 4 and which contains a rotatable drum 6 with short, projecting ejection vanes 8, said drum being driven by a motor 10. From or through an ejection slot 12 there extends an inclined chute 14 which is divided into an upper part 16, an intermediate part 18 and a lower part 20. The upper part 16 is secured in relation to the drum 6,8 and an ejector shield 22 for this in such a manner that the smooth bottom surface of the chute in the direction of same will receive a flat stream of pellet material which will be thrown out when the drum rotates at a suitable speed, for example with a peripheral speed of approx. 1.5 m/sec.

Over the lower chute part 20 there is arranged a unit 24, shown with stippled lines, which is a known spraying unit with nozzle equipment for the dosing of liquid on the layer of down-sliding material. In a manner not shown, this unit is connected through pipes and associated regulation valves to various relevant supplies of liquid, so that a controlled amount of different additives can be applied to the material after this has been cooled down from the relatively high pellet-formation temperature.

From the chute 14, the material thus handled can be conveyed further in any known manner to a desired recipient, preferably under agitation and mixing-together of the thinlayer stream, since this will contribute towards a good distribution of the additive liquid.

Figure 2:
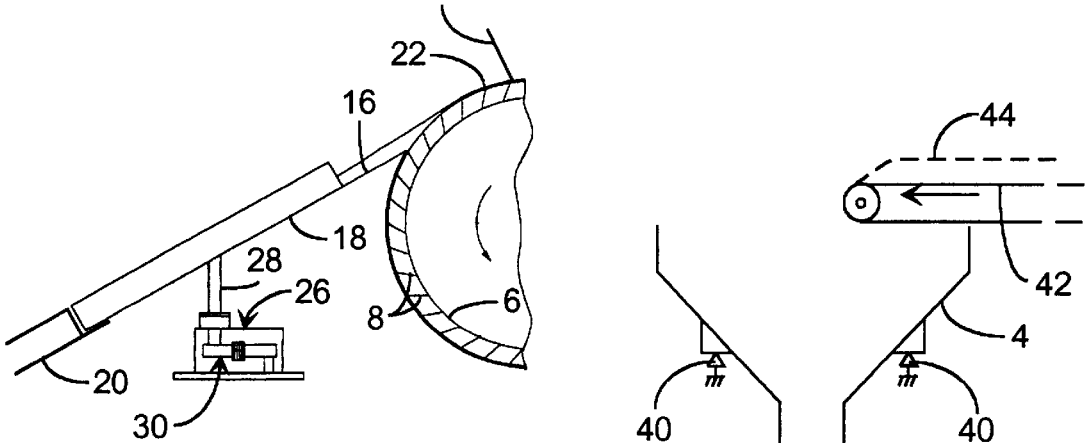
FIG. 2 is a side view of the same plant.

AS shown in FIG. 2, the intermediate chute part 18 is disposed as an independent unit on a support structure 26, i.e. on an upwardly-extending and height-displaceable stay 29 extending from said structure 26, and which is supported at the one end by a weighing device 30, the other end of which is firmly secured in the unit 26. It has been found possible hereby, and with the desired degree of accuracy, to determine variations in the overall weight F of the layer of material which at any given time is sliding down on the plate 18, so that the dosing unit 24 can be correspondingly regulated, which although not momentary occurs with arising general changes.

The slope of the weighing plate 18 should be adjusted so that the low friction which arises is compensated for by the drive effect of the gravitational forces, in that a packing-together of the material on the plate must be avoided. With the use of a smooth, stainless-steel plate, a suitable angle of approx. 35° to the horizontal has been ascertained, possibly ±5°. Moreover, the friction against the chute can vary considerably with different materials, i.e. as much as ±20% in relation to an average value. The greatest friction is generated by fine, crumbled material, while the least friction is generated by whole, large grains such as corn and large feedstuff pellets. Moreover, such large grains will have a relatively high inertia when ejected, whereby a low braking by the friction along the relatively short path of movement will be almost without measurable significance. For this reason, it is a realistic possibility to use a chute which is mounted in a fixed manner, but also to make use of an angularly-adjustable chute for full optimization of the plant.

It must be mentioned that the spraying plate 18 can possibly extend downwards through a curved path to prevent the braking of moistened material. A certain self-cleaning effect is also achieved hereby.

The bucket wheel used should be rotated at such a speed that the material which from the funnel 4 is fed down between the vanes B will be accelerated to a speed with which the material, or at any rate the main part of the material, will under the centrifugal force be thrown out from the vanes lagainst the wall part 22. With increasing speed, the dosing will naturally be increased but, however, only to a certain limit, in that at a certain speed the material from the funnel 4 can no longer run down quickly enough for the filling of the buckets. For example, it has been found that a bucket wheel with a diameter of 50 cm should not be rotated faster than 71 rpm, which will thus correspond to 100% gearing in the wheel drive. As mentioned, there can thus be used a working range of 25–100%, and for certain materials even down to 20%.

It must hereby also be taken into consideration that the filling of the buckets at high speed can be dependent not only on the kind of material, but also on the level of the material in the funnel, in that the higher the level, the more the filling is advanced.

The plates 16 and 22 should extend in such a manner that the ejected flow of material is delivered with good accuracy along the weighing plate 18 for even distribution of the material, which is quite important for a good weighing precision and herewith for good precision of the liquid dosing.

The plant or its control equipment must initially be calibrated by a test-run, whereby it is operated with a relevant, known material with known mass flow, or rather several different known mass flows at variable conditions such as bucket-wheel speed and filling height in the funnel 4. The "known" mass flow at each test can expediently be determined by operating with a reasonably large trial portion of known weight, after which the actual flow will be given by that time which it takes for the portion to run through at each individual trail-run, but in general it will be enough merely to know the run-through time for a specific weight amount of the material, regardless of whether the weight determination takes place before or after the run-through. A second possibility is to feed the material via a relatively accurate weighing belt, which without any regard to the time will provide an expression for the mass flow. Here, however, it is a condition that the bucket wheel can continuously remove the material supplied, so that this does not give rise to an increasing level of material in the funnel 4.

Such test-runs enable test graphs to be registered which show the output signal from the weighing device 30 as a function of relevant variables, also including those of both heavier and lighter materials, and these graphs can be fed into a control unit as a reference basis for the control equipment. This will typically consist of a control unit 32 which is connected to the weighing device 30 via a lead 34 and with a regulation unit in the spraying station 24, and a regulation or detector unit 36 which signals or directly controls the rotational speed of the bucket wheel 6.

In the operation of the plant where the relevant data with regard to liquid dosing per unit weight of the material, the speed of the bucket wheel 6, the kind of material etc. are fed into the control unit 32, this will hereafter be able to react to the receipt of such signals from the weighing device 30 which indicate a variation from that value which should be expected. A variation can typically be the result of the presence of a portion of material with changed specific gravity, e.g. stemming from a new supply of raw material to a silo for one of the main components in the mixture of which the feedstuff pellets consist, and on the basis of the calibration graphs fed into the control unit 32, this will then bring about a regulation either of the capacity in the spraying station 24 or of the speed of the bucket wheel 6 via the regulation unit 36, in both cases for an adjustment of the conditions in order to achieve a constant liquid dosing per unit weight of the material.

It can be relevant to use additional command or sensor signals to ascertain whether a changed weight signal from the weighing device 30 can possibly be caused by conditions other than a change which has occurred in the specific gravity. For example, an unforseen change can occur in the level of the material in the funnel 4, which can have an influence on the degree to which the buckets in the wheel are filled, and therefore it can be desirable to make use of a level detector which can provide the control unit 32 with information concerning the level of material in the funnel 4, and herewith counteract incorrect decisions regarding whether a change ascertained in the mass flow is due to a change in the material's specific gravity or a level-determined change in the filling of the wheel buckets, in that these changes should give rise to mutually different reactions with regard to an associated regulation of the spraying capacity in the station 24 and/or the speed of rotation of the bucket wheel 6.

Figure 3:
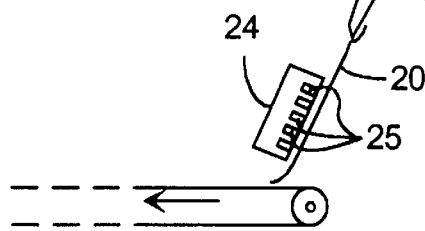
FIG. 3 is a schematic side view of a second embodiment of the plant.

In FIG. 3 is shown an embodiment where the weighing plate 18 is completely omitted, but where on the other hand the supply funnel 4 is suspended in a weighing device with one or more weighing cells 40. It is hereby possible to effect absolute weighings of the funnel and herewith to continuously provide an expression for the mass flow which leaves the funnel, and which consequently will be that flow which runs through the spraying station 24, which is shown here with a number of nozzles 25 which are connected in a not-shown manner to respective sources of liquid for individually-controlled dosing of same.

It will hereby be much more simple to adjust the liquid dosing or the speed of the bucket wheel in cases where a change is ascertained in the mass flow. On the other hand, it is important that the delivery of material to the funnel takes place in such a manner that it does not disturb the diffential measurements which are effected by the weighing equipment, i.e. the deliveries must be effected in portions of relatively large amounts during the course of quite short intervals. It is shown in FIG. 3 that the delivery can take place by means of a conveyor belt 42 which feeds a thick layer of material 44. so that each delivery can be effected in a short time. However, in practice it can be preferred that use is made of an accumulation container over the funnel 4, so that the delivery to the funnel 4 can take place by concentrated dumping of large portions, while deliveries to the accumulation container are made in an even manner.

It should be mentioned that low levels of material in the funnel 4 can give rise to uncertainty with regard to correct weighing, the reason being that the material directly above the bucket wheel does not load the walls of the funnel. Therefore, it is preferred instead to carry out a total weighing of the whole of the ejector system including the bucket wheel, whereby the differential measurements can become completely reliable. In such case, there must simply not be any fixed connection between this system and the independently-supported chute 20.

It will be understood that with the embodiment according to FIG. 3, the chute 20 can extend at a sharper angle than in FIGS. 1 and 2, in extreme cases right up to the vertical position.

It must be mentioned that it is expedient to position the plant according to the invention at the product-discharge end of a feedstuff mixing plant. The possibility is hereby achieved for the delivery of customer-adjusted amounts and recipes based on basic mixtures which are produced in larger amounts without the addition of micro-nutrients.

What is claimed is:

1. Method for the preparation of granulated material by spraying at least one additive in liquid form onto a flowing stream of the material, comprising the steps of:

ejecting an even, flat stream of the material from a dispenser onto an upper end of an inclined chute at a predetermined speed by a driven ejector arrangement;

determining a mass flow rate of the material in the flat stream;

spraying said at least one additive onto the stream of material sliding down the chute as it passes under the spraying station at a lower portion of the chute;

adjusting at least one of said predetermined speed at which the flat stream of the material is ejected from the dispenser and a spray volume of said at least one additive sprayed onto the stream of material in said spraying step as a function of mass flow rate determinations produced as said stream of material slides down the chute so as achieve a substantially constant liquid dosing per unit weight of the material.

2. Method according to claim 1, wherein said ejecting step is performed by a variable speed, volumetric-dispensing ejection arrangement; and wherein said determining step is performed by flow-weighing on a section of the chute.

3. Method according to claim 1, wherein said determining step is performed by weighing a material dispenser from which an even, flat stream of the material is ejected onto said upper end of the chute.

4. Method according to claim 1, wherein said adjusting step is performed by adjusting of said predetermined speed at which the flat stream of the material is ejected from the dispenser so as to maintain a capacity sufficient to ensure even distribution of the liquid sprayed onto the stream across the entire breadth of the stream of the material.

5. Method according to claim 1, wherein said adjusting step is also performed as a function of the specific type of material being dispensed.

6. Plant for the preparation of granulated material by spraying at least one additive in liquid form onto a flowing stream of the material, comprising:

an inclined chute providing an unobstructed, free-flowing path for the material to slide between an upper end and a lower end of the chute;

a material dispenser at an upper end of the chute, said dispenser having a driven ejector arrangement for delivering an even, flat stream of the material from the dispenser to the upper end of the chute at a p redetermined speed;

measuring equipment for determining a mass flow rate of the material in the flat stream as the stream flows down the chute;

a liquid spraying station disposed above a lower portion of the chute for spraying said at least one additive onto the stream of material sliding down the chute as it passes under the spraying station;

and means for adjusting at least one of an operating speed of the ejector arrangement and a spray volume of said at least one additive applied to the stream of material by the liquid spraying station as a finction of a mass flow rate determination output of said measuring equipment so as achieve a substantially constant liquid dosing per unit weight of the material.

7. A plant according to claim 6, wherein said ejector arrangement comprises avariable speed, volumetric-dispensing ejection arrangement; and wherein said measuring equipment is connected to the chute and provides a measurement signal as an expression of the flow of material on the chute.

8. A plant according to claim 7, wherein said measuring equipment comprises a weighing device; and wherein a section of the chute is supported on the weighing device.

9. A plant according to claim 6, wherein said measuring equipment comprises a weighing equipment upon which at least a container of the material dispenser is supported and a unit for determining the mass flow of the stream of the material as an expression of the weight of the container as function of time.

10. A plant according to claim 6,wherein said ejector arrangement is dimensioned to have a maximum capacity which can be regulated downward by at least 50% while maintaining an efficient ejection effect.

* * * * *